United States Patent Office 3,002,004

Patented Sept. 26, 1961

3,002,004

SELECTIVE MONOEPOXIDATION

Ellington M. Beavers and Joseph L. O'Brien, Elkins Park, Pa., assignors to Rohm & Haas Company, Philadelphia, Pa., a corporation of Delaware No Drawing. Filed Apr. 5, 1957, Ser. No. 650,841
9 Claims. (Cl. 260—348.5)

This invention concerns a monoepoxidation of the alkyl-substituted ethylenic linkage in a methacrylic or acrylic ester having two ethylenic bonds not conjugated with each other, one of which is alkyl-substituted. The products obtained may be represented by Formula I.

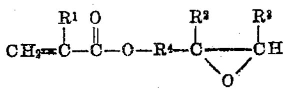

(Formula I)

where $R^1$ is a hydrogen atom or a methyl radical,
$R^2$ is a hydrogen atom or a methyl radical,
$R^3$ is a hydrogen atom or an alkyl radical of from 1 to 11 carbon atoms,
$R^4$ is a divalent alkylene radical containing from 1 to 13 carbon atoms, and
$R^4$ and $R^3$ making up a total number of carbon atoms not exceeding 20 and $R^3$ and $R^2$ not both being alkyl radicals.

These monoepoxides represent a special class of compounds having a terminal ethylenic bond in the methacryloyl or acryloyl radical and an internal or a terminal monoalkyl-substituted epoxy group derived from the corresponding ethylenic unsaturated compound.

These monoepoxides are prepared from a particular group of diethylenically unsaturated acrylic and methacrylic esters which may be represented by Formula II.

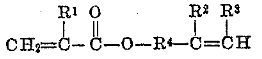

(Formula II)

where $R^1$, $R^2$, $R^3$, $R^4$, and the sum of $R^3$ and $R^4$ are defined above.

Although both ethylenic bonds within the molecule can be considered amenable to epoxidation, the particular process of this invention never causes the ethylenic linkage in the methacryloyl or acryloyl residue to be attacked, whereas only the other ethylenic linkage in the molecule is consistently epoxidized.

The complete epoxidation, under very specific conditions, of diethylenic compounds has been reported in the art. In these epoxidations, such as with linoleic or palmitoleic acids, the aim is to attack all of the ethylenic linkages and in their places to introduce oxirane oxygens. Similarly, the conversion of diethylenic compounds to bis(dihydroxy) or bis(hydroxyacryloxy) derivatives results from the attack on most ethylenic bonds. In contrast, in the present method there is epoxidized only one of the two ethylenic bonds while the other bond always is preserved intact.

Heretofore a few isolated attempts to effect limited epoxidation of unsaturated compounds have been tried under conditions and on compounds differing critically from those used in the present invention. It has been observed that there is a tendency for ethylenic bonds to be preferentially attacked, over a wide range of conditions, in the epoxidation of compounds which contain both ethylenic and acetylenic bonds. Also, there has been proposed the limited epoxidation of polyethylenically unsaturated compounds having, not isolated, but conjugated diethylenic bonds. However, there is no reliable and practical method for selectively epoxidizing one out of two non-conjugated ethylenic bonds in a compound containing only two ethylenic bonds not conjugated with each other and separated by an alkenoxy-carboxyl group and having alkyl-substituted ethylenic bond in the alkenyl radical.

In accordance with this invention, this selective epoxidation is carried out on a diethylenically unsaturated acrylic or methacrylic ester complying with Formula II. Typical thereof are:

10-methyl-10-undecenyl methacrylate,
10-methyl-10-undecenyl acrylate,
9-methyl-9-decenyl acrylate,
9-methyl-9-decenyl methacrylate,
8-methyl-8-octenyl methacrylate,
8-methyl-8-nonenyl methacrylate,
6-methyl-6-heptenyl methacrylate,
7-methyl-7-octenyl methacrylate,
5-methyl-5-hexenyl methacrylate,
5-methyl-5-hexenyl acrylate,
4-methyl-4-pentenyl methacrylate,
4-methyl-4-pentenyl acrylate,
3-methyl-3-butenyl methacrylate,
3-methyl-3-butenyl acrylate,
2-methyl-2-propenyl methacrylate,
2-methyl-2-propenyl acrylate,
2-butenyl methacrylate,
2-butenyl acrylate,
9-octadecenyl methacrylate,
9-octadecenyl acrylate,
7-hexadecenyl methacrylate,
3-dodecenyl methacrylate,
3-pentenyl methacrylate,
4-hexenyl methacrylate,
8-decenyl methacrylate,
12-tetradecenyl methacrylate,
2-hexenyl methacrylate,
4-octenyl methacrylate,
5-decenyl methacrylate,
7-dodecenyl methacrylate,
10,11-diethyl-8-tetradecenyl methacrylate,
11-isopropyl-6-dodecenyl methacrylate,
5-octadecenyl methacrylate,
4-dodecenyl methacrylate,
14-eicosenyl methacrylate,
12-eicosenyl methacrylate,
8-octadecenyl methacrylate,
4-ethyl-14-eicosenyl methacrylate,
9-dodecenyl methacrylate,
9-hexadecenyl methacrylate,
9-octadecenyl methacrylate,
5-octadecenyl methacrylate,
10-octadecenyl methacrylate,
8-eicosenyl methacrylate,
10-eicosenyl methacrylate,
12-docosenyl methacrylate,
14-tetracosenyl methacrylate, and each and every one of the corresponding acrylates.

The diethylenically unsaturated acrylic or methacrylic esters are selectively epoxidized, in accordance with this invention, by a method which comprises reacting, in the presence of a small amount of a neutralizing agent, at a reactive temperature from about 30° to about 50° C., preferably in the range from 40° to 50° C., a diethylenically unsaturated acrylic or methacrylic ester complying with Formula II above, by adding thereto a specified amount of a particular peracid, reacting by bringing together, and by maintaining the temperature within the specified range, until the epoxidation is substantially completed and separating the resulting alkyl-substituted monoepoxyalkyl acrylate or methacrylate.

It has been found, in accordance with this selective epoxidation of the alkyl-substituted ethylenic bond of the esters of Formula II, that the order of addition of the reactants is important and that it is the peracetic acid which must be added to the unsaturated ester and not vice-versa. Reverse addition, i.e., addition of the unsaturated ester to the peracetic acid, especially when carried out gradually and slowly, and particularly at a reactive temperature, results in a considerable amount of undesirable side-products. Providing that it is the peracetic acid which is added to the diunsaturated ester, the addition of the requisite amount of peracetic acid may be performed in any convenient manner taking into the account the exotherm created by the reaction and the temperature limitations.

Peracids found to be effective include perbenzoic acid, monoperphthalic acid, and peracetic acid in chloroform, ether and acetic acid, respectively. Of the peracids which may be used, peracetic acid is preferred because it is commercially available and the yields of monoepoxide ester obtained, when it is used, are of substantial commercial interest at the present time.

Peracetic acid may be prepared by reacting glacial or aqueous acetic acid with aqueous hydrogen peroxide in the presence of about 1% of sulfuric acid as catalyst. The hydrogen peroxide may be the commercial 27.5% or 100 volume product or it may be an aqueous solution of high peroxide content as, for instance, 50 to 90% $H_2O_2$. Peracetic acid may also be prepared by other known procedures or it may be obtained commercially. While 85% peracetic acid solution in acetic acid may be used, it is preferred for safety reasons to employ a 40% peracetic acid solution in acetic acid. The solvent for the peracetic acid is water-free and is also a solvent for the resulting monoepoxides. The temperature should be maintained within the range of about 30° to about 50° C., and preferably from about 40° to about 50° C. and as close to 50° C. as practical. By as close as practical to 50° C. is meant as close to 50° C. as may be obtained in commercial operations with standard equipment under reasonably diligent control of one skilled in the art. Below 30° C. the speed of the reaction is substantially reduced and above 60° C. undesirable by-products result.

Not only has it been found that the order of addition of the reactants and the temperature range are critical but also that this monoepoxidation is further controlled and limited to only one ethylenic bond by having present during the epoxidation a specific basic agent.

Typical basic agents are of the substantially water-soluble type and must be so basic that a 0.1 N aqueous solution of the basic agent has a pH of at least 8, at 25° C. Included in this category are the oxides and hydroxides of the alkali metals such as sodium hydroxide, potassium hydroxide, lithium oxide, and the like, as well as the salts of the alkali metals and weak aliphatic carboxylic acids, exemplified by sodium acetate, potassium carbonate, and lithium carbonate and the like. The oxides and hydroxides of the alkaline earth metals are likewise operable as typified by lime, zinc oxide, barium oxide, and the like. The sodium and potassium salts of the particular acids which are predecessors of the peracids employed are very effective in controlling the epoxidation and therefore often sodium acetate is favored. These basic agents may be in the anhydrous or hydrated form. The basic agents should be employed in an amount from about 0.5 to 10%, preferably from about 2.5 to 6.5%, by weight of the peracetic solution used. The basic agent should be present during the epoxidation and may be added at any convenient time to either one or to both reactants.

The amount of epoxidizing peracid used to epoxidize the esters of Formula II is from about 1.0 to 1.5 moles, and preferably 1.05 mole per mole of starting diunsaturated ester. When peracetic acid is used, a 40% peracetic acid solution in acetic acid is very convenient. Smaller amounts of peracetic acid result in less efficient epoxidation but larger amounts, such as 2 moles of peracetic acid, result contrary to expectations, not in a diepoxide but in a reduced yield of monoepoxide.

The ethylenically unsaturated esters which are epoxidized, and which conform to Formula II above, are prepared in a known manner by acid-catalyzed esterification of the corresponding open-chain aliphatic monohydric mono-olefinic alcohols of not more than 20 carbon atoms or of mixtures thereof. Such alcohols are conventional and known. They include: 2-buten-1-ol, 4-hexen-1-ol, 8-decen-1-ol, 12-tetradecen-1-ol, 2-hexene-1-ol, 4-octen-1-ol, 5-decen-1-ol, 7-dodecen-1-ol, 10,11-diethyl-8-tetradecen-1-ol, 10,11-diisopropyl-6-dodecen-1-ol, 5-octadecen-1-ol, 4-dodecen-1-ol, 4-ethyl-14-eicosen-1-ol, 14-eicosen-1-ol, 12-eicosen-1-ol, 8-octadecen-1-ol, 9-dodecen-1-ol, 9-hexadecen-1-ol, 9-octadecen-1-ol, 5-octadecen-1-ol, 10-octadecen-1-ol, 8-eicosen-1-ol, 10-eicosen-1-ol, 12-docosen-1-ol, and 14-tetracosen-1-ol.

These and similar unsaturated alcohols are conventional and may be prepared by known procedures. The higher molecular weight alcohols may be obtained from commercial grade alcohols, for instance the so-called "oil alcohols," which are mixtures of alcohols obtained by reduction of esters of the fatty acids of vegetable oils. These oil alcohols include the mixtures of alcohols obtained, for example, by sodium-alcohol reduction of fatty acids of such common oils as soybean, linseed, safflower, cottonseed, perilla, and fish oils. Commercial grades of oil alcohols also contain various amounts of 9,12-octadecadien-1-ol, and 9,12,15-octadecatrien-1-ol. The amount, however, of such alcohols which may be present in vegetable or fish oils is not sufficient to require separation before esterification through such separation may be performed if desired. Commonly, such vegetable, animal, and fish oils are derivatives of fatty acid mixtures containing various amounts of oleic, ricinoleic, petroselinic, cetoleic, erucic, and nervonic acids.

The acid-catalyzed esterification of these and similar alcohols is performed with excess glacial methacrylic or acrylic acid in an inert solvent, in the presence of a polymerization inhibitor. Alternatively, by known procedures, the esters may be prepared by base-catalyzed transesterification of the monoolefinic alcohols with an ester of acrylic or methacrylic acid in the presence of a polymerization inhibitor. The $\alpha,\omega$-olefinic alcohols may also be reacted with acrylic or methacrylic anhydrides or with acryloyl or methacryloyl chlorides preferably in the presence of an HCl-acceptor, to yield the desired $\alpha,\omega$-diethylenically unsaturated esters.

For the transesterification there may be used such typical esters as methyl methacrylate, methyl acrylate, ethyl acrylate, ethyl methacrylate, isobutyl methacrylate, hexyl methacrylate, and 2-ethylhexyl acrylate. Among those esters the lower alkyl esters are preferred since the azeotrope formed therewith is removed with greater ease during transesterification.

The polymerization inhibitors that may be used during esterification or transesterification include di-$\beta$-naphthol, trinitrotoluene, hydroquinone, p-hydroxydiphenylamine, and similar inhibitors. However, since an inhibitor, such as p-hydroxydiphenylamine, sometimes forms colored oxidation products which are difficult to remove from the ester, it is preferred to use such polymerization inhibitors as 2,2'-bis(p-hydroxyphenyl) propane or N,N'-di-2-(1,4-naphthoquinonyl)-p-phenylenediamine. The inhibitor should be used in an amount from about 0.1 to 10%, preferably from about 1 to 3%, based on the weight of total reactants.

In the process of this invention the particular diethylenic ester which is to be monoepoxidized is charged to a reactor equipped with an agitator, cooling and heating means, a temperature recorder, a reflux condenser, and an addition tube. The ester is heated, while being stirred, to a temperature as close as practical to 50° C. but such that the exotherm resulting from the subsequent addition of the peracetic acid to the ester does not raise the temperature appreciably above 50° C. Therefore, the ester is initially heated to within a range of about 30° to about 45° C. To the ester there is then added the peracetic acid and this order of addition, as has been pointed out above, is very important. The acid added to the ester is a 40% aqueous peracetic acid solution in acetic acid in an amount from about 1.0 to 1.5 mole, and preferably about 1.05 to 1.10 mole, per mole of starting ester. With the peracetic acid there is previously mixed a small amount of basic agent, such as sodium acetate, the amount being sufficient to maintain effective control of the reaction. This amount is usually from 2.5 to 6.5%, commonly about 3%, by weight of the peracetic acid solution used. The mixture of peracetic acid and basic agent is then added, while actively stirring, to the ester either continuously or portion-wise. After a short induction period a moderate exotherm occurs. Cooling is applied to maintain the temperature of the mixture within the range of 40° to 50° C. and as close as practical to 50° C. While active mixing and cooling as required are continued the remainder of the peracetic acid is added. The epoxidation proceeds smoothly and the rate of disappearance of the peracetic acid is followed by periodic analysis of the reaction mixture. When all the peracetic acid has been added, heating to within a temperature range of 40° to 50° C. is continued while the reaction mixture is continuously stirred. Stirring and heating are continued until the rate of peracetic acid utilization has fallen to a low value. This usually occurs after four to five hours. At that time it is generally observed that about 91 to 96% of the theoretical amount of peracetic acid has been utilized. The reaction mixture is then separated into an aqueous and an organic phase. This is commonly performed at room temperature. The organic phase is an oil which comprises the monoepoxy, hydroxy-acetoxy, and monoethylenic alkyl esters. The rate of separation of the organic phase from the aqueous phase may be promoted by the addition of water and by the addition of a water-immiscible liquid which is a solvent for the monoepoxy and monoethylenic alkyl esters. Typical useful hydrocarbon solvents include toluene, ether, xylene, heptane, octane, as well as chlorinated liquids such as ethylene dichloride and carbon tetrachloride. The organic phase then comprises substantial amounts of monoepoxy alkyl methacrylates or acrylates, generally in an amount of at least 70% and often in an amount more than 75% based on the weight of the oil. The remainder generally comprises hydroxyacetoxy monoethylenic esters, and a limited amount of dihydroxy derivatives. This monoepoxide ester oil is a very useful product which may be used as a monomeric polymerizable mixture in various applications. If desired, this oil fraction may be further purified by washing with a salt solution, such as saturated sodium chloride solution, and then with a neutralizing solution, such as sodium hydroxide solution. This monoepoxy alkyl methacrylate or acrylate monomeric composition is unusual in being amenable to further polymerization reactions without requiring particular treatment. Preferably before use the oil monoepoxide is stripped by distillation, in the presence of a polymerization inhibitor, of any excess solvent that might be present. The monoepoxide ester is then removed by conventional methods such as by distillation under reduced pressure. Various procedural variations may be performed by one skilled in the art. The basic agent may be added to the ester before the addition of the peracetic acid. However, whether the basic agent is added to the ester or to the peracetic acid, in either case it is preferred that substantially all the basic agent be present at the start of the monoepoxidation. Mixing the diunsaturated ester with the peracetic acid, in the presence or absence of the basic compound, at temperatures below reactive epoxidation temperatures, and then raising the temperature to within the reactive range is not as efficient as the instant procedure.

What is required in accordance with this invention is that the ester be reacted, by bringing the ester together with the requisite amount of peracetic acid, at a temperature from about 30° to about 50° C.—the peracetic acid having been added to the ester—under good mixing, and in the presence of a basic compound. While the presence of a particular basic compound is required during the epoxidation, there is no need for a copolymerization inhibitor to prevent the polymerization of the acrylates or methacrylates. Addition of a polymerization inhibitor may be omitted until final stripping of the resulting monoepoxide ester. If desired, however, the inhibitor may be added at any time before the epoxidation reaction. Polymerization inhibitors which may be used include such known inhibitors as p-hydroxydiphenylamine, N,N'-diphenylphenylenediamine, 2,5-di-tert.-butylhydroquinone, di-β-naphthol and the like. They may be used in an amount from about 0.1 to about 5% and preferably in the range of to 0.5 to 2%, based on the weight of starting ester. Two polymerization inhibitors, 2,2'-bis-(p-hydroxyphenyl) propane and even more especially N,N'-di-2-(1,4-naphthoquinonyl)-p-phenylenediamine, in the prescribed amount, have been found particularly effective in preventing polymerization during stripping, development of undesirable color, and resistance to attack by the peracid when added to the starting diethylenic ester before epoxidation takes place.

The monoepoxyalkyl methacrylates and acrylates which may be obtained in accordance with this invention include: 10,11-epoxy-10-methylundecyl methacrylate, 10,11-epoxy-10-methylundecyl acrylate, 9,10-epoxy-9-methyldecyl methacrylate, 9,10-epoxy-9-methyldecyl acrylate, 8,9-epoxy-8-methylnonyl methacrylate, 7,8-epoxy-7-methyloctyl methacrylate, 6,7-epoxy-6-methylheptyl methacrylate, 5,6-epoxy-5-methylhexyl methacrylate, 5,6-epoxy-5-methylhexyl acrylate, 4,5-epoxy-4-methylpentyl methacrylate, 4,5-epoxy-4-methylpentyl acrylate, 3,4-epoxy-3-methylbutyl methacrylate, 3,4-epoxy-3-methylbutyl acrylate, 2,3-epoxybutyl methacrylate, 2,3-epoxybutylacrylate, 2,3-epoxy-2-methylpropyl methacrylate, 2,3-epoxy-2-methylpropyl acrylate, 3,4-epoxypentyl methacrylate, 4,5-epoxyhexyl methacrylate, 7,8-epoxydodecyl methacrylate, 5,6-epoxyoctadecyl methacrylate, 4-ethyl-14,15 - epoxyeicosyl methacrylate, 12,13 - epoxyeicosyl methacrylate, 8,9 - epoxydodecyl methacrylate, 9,10-epoxyoctadecyl methacrylate, 5,6-epoxyoctadecyl methacrylate, 12,13-epoxyeicosenyl methacrylate, 13,14-epoxytetracosyl methacrylate, and each and every one of the corresponding acrylates.

The epoxy esters described above may be readily polymerized alone or with other compounds containing a vinylidene group, $CH_2{=}C{<}$. Such polymerization may be effectuated in bulk, in solution, or in emulsion. Examples of copolymerizable materials are alkyl esters of methacrylic and acrylic acids, the alkyl group of which is straight or branched, of one to eight carbon atoms. Illustrative alkyl groups are methyl, ethyl, isopropyl, n-butyl, n-octyl, and 2-ethylhexyl as well as the isomers of these radicals. Polymerization and copolymerization is effectuated at a temperature from about 0° to 100° C. preferably in the range from about 40° to 80° C. in the presence of suitable free-radical catalysts. Typical catalysts are α,α'-bis-azoisobutyronitrile, benzoyl peroxide, and stearoyl peroxide. The catalysts are used in an amount from 0.01 to 5% and preferably from 0.02 to 2% based on the weight of the polymerizable compound.

These copolymers are useful in coating compositions, paper-treating, and particularly for shrink-proofing and felt-proofing of textiles.

The starting unsaturated alcohols are prepared by the methods described in the art or by convenient modifications thereof. For instance crotyl alcohol may be prepared by the reduction of crotonaldehyde with aluminum isopropoxide [Young, Hartung, and Crossley, J. Am. Chem. Soc. 58, 100 (1936)]. Methallyl alcohol is commercially available from the Shell Development Company. It may be prepared by the hydrolysis of methallyl chloride [Tamele, Ott, Marple, and Hearne, Ind. Eng. Chem. 33, 115 (1941)]. 3-penten-1-ol may be prepared from 2,3-dichlorotetrahydrofuran by reaction with the methyl Grignard reagent, followed by cleavage with sodium sand (Crombie and Harper, J. Am. Chem. Soc. 1950, 1714). 4-methyl-4-penten-1-ol may be prepared by reaction of ethylene oxide with the Grignard reagent from methallyl chloride, in the manner described by Kharasch and Fuchs, J. Org. Chem. 9, 370 (1944). Oleyl alcohol may be prepared by the sodium and alcohol reduction of esters of oleic acid [Cf. Reid, et al., Organic Syntheses, Coll. vol. II, 468 (1943); Adkins and Gillespie, ibid., 29, 80 (1949)]. Other alcohols are similarly prepared.

Below is shown illustrative preparation of typical diunsaturated esters.

EXAMPLE A

*Crotyl methacrylate*

585 grams of methyl methacrylate, 84 grams of crotyl alcohol, 6.7 grams of p-toluenesulfonic acid monohydrate and 6.7 grams of N,N'-di-2-(1,4-naphthoquinonyl)-p-phenylenediamine are charged to a one-liter, three-necked flask equipped with a stirrer, thermometer, and a fractionating column fitted with an automatic distillation head set for a maximum distillation temperature of 70° C. The charge is heated in an oil bath maintained at 110° to 120° C. while the methyl methacrylate methanol azeotrope is collected at the top of the column. After a total of 42 ml. of distillate has been collected, the mixture is cooled and 4.0 grams of anhydrous sodium acetate is added. The mixture is filtered and then subjected to reduced pressure to remove excess methyl methacrylate. After addition of 3.0 grams of N,N'-di-2-(1,4-naphthoquinonyl)-p-phenylenediamine, the residue is distilled under reduced pressure. The product which collected at 64° to 67° C./20 mm. amounted to 103.5 grams (64% yield), and it was identified as crotyl methacrylate, $n_D^{25}$, 1.4400. Analysis: calculated for $C_8H_{12}O_2$: saponification number 400. Found: saponification number 392.

EXAMPLE B

*Preparation of methallyl methacrylate*

600 grams of methyl methacrylate, 450 grams of benzene, 108 grams of methallyl alcohol, and 7 grams of N,N'-di-2-(1,4-naphthoquinonyl)-p-phenylenediamine are charged to a two-liter three-necked flask equipped with a stirrer, thermometer, addition funnel and a fractionating column fitted with an automatic distillation head set for a maximum distillation temperature of 60° C. The charge is heated in an oil bath maintained at 135° to 140° C. and 5 ml. of a solution of 1 gram of sodium in 20 ml. of methanol is added. The charge is further heated during the gradual addition of another 10 ml. of the catalyst solution, while the benzene methanol azeotrope is collected at the top of the column. After about six and one-half hours, a total of 140 ml. of distillate has been collected. The mixture is cooled and the benzene and excess methyl methacrylate removed under reduced pressure. The residue is then distilled under reduced pressure. The product which collected at 65° to 67° C./20 mm. is identified as methallyl methacrylate, $n_D^{25}$, 1.4365. Analysis: calculated for $C_8H_{12}O_2$: saponification number 400. Found: saponification number 411.

EXAMPLE C

*4-methyl-4-penten-1-yl methacrylate*

Methyl methacrylate (365 grams, 3.65 moles), 4-methyl-4-penten-1-ol (74 grams, 0.74 mole), di-β-naphthol (5 grams), and copper powder (1 gram) are charged to a one-liter, three-necked flask fitted with stirrer, thermometer, gas inlet tube, dropping funnel, and a fractionating column having a total reflux partial takeoff head. The system is maintained under an $N_2$ atmosphere. Sodium (1 gram) dissolved in methanol (16 cc.) is placed in the dropping funnel, and one-third of the solution is added to the reaction mixture in one portion. The mixture is heated to reflux and the methyl methacrylate methanol azeotrope is collected. Additional catalyst is added while a total of 35 grams of the azeotrope is separated at the head. The pot temperature at the end of the reaction reached 104° C. and the head temperature reached 69° C. The reaction mixture is then distilled under reduced pressure to give 100 grams of product, boiling point 40° to 70° C. at 1 mm. Redistillation gives in good yield a product which has boiling point of 49° to 51.5° C. at 1.5 mm., $n_D^{20}$, 1.4471. Calculated for $C_{10}H_{16}O_2$: percent C=71.4; percent H=9.6; saponification number=333. Found percent C=71.7; percent H=10.0; saponification number=323.

The following examples, which further disclose the invention illustrate the new selective monoepoxidation of the particular diethylenic esters used herein. The examples and the preparation of some typical monoepoxy esters of this invention are not to be construed as limiting the invention in spirit or scope.

EXAMPLE 1

140 grams (1 mole) of crotyl methacrylate is charged to 500 ml. three-necked flask equipped with a stirrer, thermometer, addition funnel, and reflux condenser. The mixture is stirred and heated to 45° C. A solution of 5.7 grams of anhydrous sodium acetate in 190 grams (1 mole) of 40% peracetic acid in acetic acid is added from the addition funnel over a thirty-minute period. Ice-bath cooling is applied as necessary to keep the temperature as close as possible to 45° C. After about two hours, the exothermic phase of the reaction is over and moderate heating is applied to keep the temperature close to 45° C. The heating is continued for about three-and-one-half hours, when it is determined that 85% of the peracetic acid has been consumed. The reaction mixture is then cooled and 200 ml. of water is added. A clear solution results. The addition of solid sodium chloride causes the separation of an oil, which is extracted with benzene. The benzene solution is washed with ice-cold 5% sodium hydroxide solution and then with water. After being dried over anhydrous magnesium sulfate, the benzene solution is filtered and distilled at reduced pressure. The residue is distilled at reduced pressure in the presence of 1.5 gram of N.N'-di-2-(1,4-naphthoquinonyl)-p-phenylenediamine. The product which is collected at 45° to 50° C./0.25 mm. amounts to 65.5 grams (42% yield) and is identified as 2,3-epoxybutyl methacrylate, $n_D^{25}$ 1.4422. Redistillation of this product gives a pure sample, $n_D^{25}$ 1.4417. Analysis: calculated for $C_8H_{12}O_3$: oxirane oxygen, 10.3%. Found: oxirane oxygen 9.6%.

The procedure above is repeated but charging to the reactor with the crotyl methacrylate 2.5 grams of N,N'-di-2-(1,4-naphthoquinonyl)-p-phenylenediamine. Equally good results are obtained.

In following the same procedure as in Example 1 the corresponding acrylate is obtained.

EXAMPLE 2

One mole of 10-methyl-10-undecenyl methacrylate and about 3.0 grams of N,N'-di-2-(1,4-naphthoquinonyl)-p-phenylenediamine are charged to the reactor. The mixture is heated to 45° C. and 4.75 grams of anhydrous sodium acetate in 1.05 mole of 40% peracetic acid is added, while stirring. Temperature is maintained as close as practical to 50° C. by ice-bath cooling and by heating moderately during the later phases of the reaction. When the epoxidation is substantially completed the product is worked up as described in Example 1. It is 10,11-epoxy-10-methylundecyl methacrylate.

In Example 1 there are used other agents substantially water-soluble and basic to the extent that a 0.1 N aqueous solution of the basic agent has a pH of at least 8.0, at 25° C. For instance, there is satisfactorily used sodium hydroxide in the required amount.

In Example 2 the temperature is allowed to rise to 50° C. Substantially the same yields are obtained. In that example when 2.5 moles of 40% peracetic acid in acetic acid is used substantially smaller amounts of monoepoxide are obtained.

Following the same general procedure as in Example 1 and 2, there is obtained 8,9-epoxy-8-methylnonyl methacrylate, 7,8-epoxy-7-methyloctyl methacrylate, 5,6-epoxy-5-methylhexyl methacrylate, 3,4-epoxy-3-methylbutyl acrylate and similar other epoxide esters.

In Example 1 and 2 sodium acetate is effectively substituted by equivalent amounts of potassium carbonate, sodium hydroxide, and potassium acetate.

EXAMPLE 3

70 grams of methallyl methacrylate, 95 grams of 40% peracetic acid in acetic acid, 2.8 grams of anhydrous sodium acetate and 0.7 gram of N,N'-di-2-(1,4-naphthoquinonyl)-p-phenylenediamine are reacted according to the procedure illustrated in Example 1. The product which is collected at 44° to 52° C./0.6 mm. amounts to 50 grams (64% yield) and is identified as 2,3-epoxy-2-methylpropyl methacrylate, $n_D^{25}$ 1.4408.

EXAMPLE 4

77 grams of 3-pentyl methacrylate, 95 grams of 40% peracetic acid in acetic acid, 2.8 grams of anhydrous sodium acetate and 0.7 gram of N,N'-di-2-(1,4-naphthoquinonyl)-p-phenylenediamine are reacted according to the procedure illustrated in Example 1. The product is identified as 3,4-methacrylate.

EXAMPLE 5

84 grams of 4-methyl-2-pentyl methacrylate, 95 grams of 40% peracetic acid, 2.8 grams of anhydrous sodium acetate and 0.7 gram of N,N'-di-2-(1,4-naphthoquinonyl)-p-phenylenediamine are reacted according to the procedure illustrated in Example 1. The temeprature is maintained close to 50° C. The product is identified at 4,5-epoxy-4-methylpentyl methacrylate.

EXAMPLE 6

25.2 grams of methallyl acrylate, 38.0 grams of 40% peracetic acid in acetic acid and 1.14 grams of anhydrous sodium acetate are reacted according to the general procedure illustrated in Example 1. The product which collected at 45° to 55° C./0.55 to 1.0 mm. amounts to 13.8 grams (49% yield) and is identified as 2,3-epoxy-2-methylpropyl acrylate, $n_D^{25}$ 1.4365.

EXAMPLE 7

*9,10-epoxyoctadecyl methacrylate*

In a 250 ml. three-necked flask, fitted with a stirrer, thermometer, reflux condenser, and addition funnel there is placed a mixture of 33.7 grams (0.1 mol) of oleyl methacrylate and 0.3 gram of hydroquinone. To the rapidly stirred mixture, there is added a solution of 0.57 gram of anhydrous sodium acetate and 19.0 grams (0.1 mol) of 40% peracetic acid in glacial acetic acid over a period of thirty minutes. The temperature is allowed to rise to 50° C. and is maintained there for six hours, first by application of an ice-water bath and finally a hot-water bath. After cooling to room temperature, 100 ml. of distilled water is added and the organic layer is removed. The aqueous layer is extracted with two 50 ml. portions of benzene. The combined organic layer and benzene extract then washed with two 100 ml. portions of water, iced 5% aqueous sodium hydroxide solution and water, successively. After drying over magnesium sulfate, the benzene is removed under reduced pressure to 35° C./1 mm. in the presence of a few crystals of hydroquinone. The clear, colorless oil obtained in 94% yield is identified as 9,10-epoxyoctadecyl methacrylate and $n_D^{25}$ 1.4577 to 1.4580, saponification number 135, theoretical saponification number 159, 3.7% oxirane oxygen, 4.5% theoretical oxirane oxygen.

EXAMPLE 8

Following the same general procedure as in Example 7, 0.1 mole of 8-eicosenyl methacrylate is mixed with 0.4 gram of hydroquinone. While stirring actively there is added thereto a solution of 1.0 gram of anhydrous sodium acetate and 19.0 grams of 40% peracetic acid in glacial acetic acid. The temperature is maintained below 50° C. and above 45° C. Then the epoxidation is substantially completed. The product 8,9-epoxyeicosenyl methacrylate is worked up following substantially the same procedure as in Example 7.

In a similar fashion there are prepared from the corresponding unsaturated esters the following epoxides: 13,14-epoxytetracosyl methacrylate, 12,13-epoxyeicosyl methacrylate, 8,9-epoxydodecyl methacrylate, 4,5-epoxyhexyl methacrylate, and 13,14-epoxytetracosyl acrylate. Providing the temperature is maintained as close as practical to 50° C. and at least above 30° C., preferably above 45° C. effective epoxidation results. Other alkaline agents are used most effectively of the type described above in controlling the reaction to the desired bond of unsaturation. Other acrylates, such as 9,10-epoxyoctadecyl acrylate, are prepared in substantially the same manner as in Example 7.

We claim:

1. A process of selective monoepoxidation of the ethylenic bond in the alcohol portion of an ester of the formula $$CH_2=\overset{R^1}{C}-\overset{O}{\overset{\|}{C}}-O-R^4-\overset{R^2}{C}=\overset{R^3}{C}H \qquad (I)$$

where R' and $R^2$ are selected from the class consisting of a hydrogen and a methyl group, $R^3$ is selected from the class consisting of a hydrogen atom and an alkyl radical containing from 1 to 11 carbon atoms, and $R^4$ is a divalent alkylene radical containing from 1 to 13 carbon atoms, the selection of $R^2$ and $R^3$ being such that when one is alkyl, the other is hydrogen, and $R^3$ plus $R^4$ together contain no more than 20 carbon atoms, which comprises the steps of admixing, in the presence of a water-soluble basic agent which, in a 0.1 normal concentration in water imparts thereto a pH of at least 8, at 25° C., and which is selected from the group consisting of alkali metal oxides, alkali metal hydroxides, alkaline earth metals and salts of weak saturated aliphatic monocarboxylic acids, an ester of Formula I with 1.0 to 1.5 mole of peracetic acid per mole of ester and maintaining the temperature within the range of 30° to 50° C. until monoepoxidation of the ethylenic bond in the ester is completed.

2. The process of claim 1 in which the basic agent is sodium acetate.

3. The process of claim 1 in which the amount of basic agent is about 0.5 to 10% by weight of the peracetic acid.

4. A process for preparing 2,3-epoxybutyl methacrylate which comprises admixing to 2-butenyl methacrylate, in the presence of sodium acetate, 1.0 to 1.5 mole of peracetic acid per mole of said ester, and maintaining the temperature in the range of 30° to 50° C. until monoepoxidation of the ethylenic bond in the ester is completed.

5. A process for preparing 2,3-epoxy-2-methylpropyl methacrylate which comprises admixing to 2-methyl-2-propenyl methacrylate, in the presence of sodium acetate, 1.0 to 1.5 mole of peracetic acid per mole of said ester, and maintaining the temperature in the range of 30° to 50° C. until monoepoxidation of the ethylenic bond in the ester is completed.

6. A process for preparing 3,4-epoxypentyl methacrylate which comprises admixing to 3-pentenyl methacrylate, in the presence of sodium acetate, 1.0 to 1.5 mole of peracetic acid per mole of said ester, and maintaining the temperature in the range of 30° to 50° C. until monoepoxidation of the ethylenic bond in the ester is completed.

7. A process for preparing 4,5-epoxy-4-methylpentyl methacrylate which comprises admixing to 4-methyl-4-pentenyl methacrylate, in the presence of sodium acetate, 1.0 to 1.5 mole of peracetic acid per mole of said ester and maintaining the temperature in the range of 30° to 50° C. until monoepoxidation of the ethylenic bond in the ester is completed.

8. A process for preparing 9,10-epoxyoctadecyl methacrylate which comprises admixing to 9-octadecenyl methacrylate, in the presence of sodium acetate, 1.0 to 1.5 mole of peracetic acid per mole of said ester, and maintaining the temperature in the range of 30° to 50° C. until monoepoxidation of the ethylenic bond in the ester is completed.

9. In a process of selective monoepoxidation of the ethylenic bond in the alcohol portion of an ester of the formula $$CH_2=\underset{}{C}(R^1)-C(=O)-O-R^4-C(R^2)=CH(R^3) \qquad (I)$$

where $R^1$ and $R^2$ are selected from the class consisting of a hydrogen and a methyl group, $R^3$ is selected from the class consisting of a hydrogen atom and an alkyl radical containing from 1 to 11 carbon atoms, and $R^4$ is a divalent alkylene radical containing from 1 to 15 carbon atoms, the selection of $R^2$ and $R^3$ being such that when one is alkyl, the other is hydrogen, and $R^3$ plus $R^4$ together contain no more than 20 carbon atoms, which comprises adding to the ester of Formula I 1.0 to 1.5 mole of peracetic acid per mole of ester, the improvement which comprises maintaining the temperature in the range of 30° to 50° C. until monoepoxidation of the ethylenic bond in the ester is completed.

References Cited in the file of this patent

UNITED STATES PATENTS

| | | |
|---|---|---|
| 2,464,137 | Levy | Mar. 8, 1949 |
| 2,556,075 | Erickson | June 5, 1951 |
| 2,571,208 | Craig | Oct. 16, 1951 |
| 2,583,569 | Herzfeld | Jan. 29, 1952 |
| 2,785,185 | Phillips | Mar. 12, 1957 |
| 2,794,029 | Phillips | May 28, 1957 |
| 2,935,516 | Frostick et al. | May 3, 1960 |

FOREIGN PATENTS

| | | |
|---|---|---|
| 525,888 | Canada | June 5, 1956 |

OTHER REFERENCES

Swern: J.A.C.S., vol. 69, pp. 1692–1698 (1947).

Gilman: Organic Chemistry, vol. IV, pp. 1171–1172 (1953).

Elderfield, Heterocyclic Compounds, vol. I, pp. 5 and 6 (1950).